United States Patent
Lee et al.

(10) Patent No.: US 9,852,061 B2
(45) Date of Patent: Dec. 26, 2017

(54) MEMORY DEVICE AND OPERATING METHOD OF MEMORY DEVICE

(75) Inventors: Jae Don Lee, Paju-si (KR); Choong Hun Lee, Yongin-si (KR); Gyu Sang Choi, Seoul (KR); Min Young Son, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1722 days.

(21) Appl. No.: 12/358,278

(22) Filed: Jan. 23, 2009

(65) Prior Publication Data

US 2010/0088467 A1 Apr. 8, 2010

(30) Foreign Application Priority Data

Oct. 2, 2008 (KR) .................... 10-2008-0097061

(51) Int. Cl.
*G06F 12/02* (2006.01)

(52) U.S. Cl.
CPC .. *G06F 12/0246* (2013.01); *G06F 2212/7201* (2013.01); *G06F 2212/7203* (2013.01); *G06F 2212/7205* (2013.01); *G06F 2212/7207* (2013.01)

(58) Field of Classification Search
None
See application file for complete search history.

(56) References Cited

U.S. PATENT DOCUMENTS

| | | | | |
|---|---|---|---|---|
| 5,933,847 | A * | 8/1999 | Ogawa | G06F 12/023 711/103 |
| 7,397,686 | B2 * | 7/2008 | Takashima et al. | 365/145 |
| 2007/0033356 | A1 * | 2/2007 | Erlikhman | 711/162 |
| 2008/0034150 | A1 * | 2/2008 | Mitsuishi | 711/102 |
| 2008/0155160 | A1 * | 6/2008 | McDaniel | 710/306 |
| 2008/0177937 | A1 * | 7/2008 | Nishihara et al. | 711/103 |
| 2008/0270680 | A1 * | 10/2008 | Chang | 711/103 |
| 2009/0198869 | A1 * | 8/2009 | Mosek | 711/103 |
| 2010/0023652 | A1 * | 1/2010 | Kono | 710/18 |
| 2010/0023672 | A1 * | 1/2010 | Gorobets | G06F 12/0246 711/103 |
| 2010/0023674 | A1 * | 1/2010 | Aviles | 711/103 |
| 2010/0030944 | A1 * | 2/2010 | Hinz | 711/103 |

FOREIGN PATENT DOCUMENTS

KR 10-2006-0090088 A 8/2006
KR 10-0771521 B1 10/2007

OTHER PUBLICATIONS

Korean Office Action dated Jul. 28, 2014 in corresponding Korean Application No. 10-2008-0097061 (8 pages with English translation).

* cited by examiner

*Primary Examiner* — Charles Rones
*Assistant Examiner* — Ryan Dare
(74) *Attorney, Agent, or Firm* — NSIP Law

(57) ABSTRACT

A memory device may include a non-volatile memory and non-volatile RAM. The non-volatile memory may include a data block and a metadata block. Metadata information with respect to the data block may be included in the metadata block. A portion of metadata with respect to the data block or the metadata with respect to the metadata block may be stored in the non-volatile RAM.

14 Claims, 10 Drawing Sheets

Write Map Cache - Sequential Write

| LBN 120h | PA mapped to Logical Page 0 | PA mapped to Logical Page 1 | ... | PA mapped to Logical Page n |
|---|---|---|---|---|
| LBN 1F0h | PA mapped to Logical Page 0 | PA mapped to Logical Page 1 | ... | PA mapped to Logical Page n |

214

Write Map Cache - Random Write

| LA 10F0h | PA mapped to LA 10F0h |
|---|---|
| LA 11CAh | PA mapped to LA 11CAh |
| | ... |
| LA 1FA0h | PA mapped to LA 1FA0h |

Write Data Buffer

| LPN 1110h | Status | Sector 0 Data | Sector 1 Data | Sector 2 Data | Sector 3 Data |
|---|---|---|---|---|---|
| LPN 1111h | Status | Sector 0 Data | Sector 1 Data | Sector 2 Data | Sector 3 Data |
| LPN 1F4Ch | Status | Sector 0 Data | Sector 1 Data | Sector 2 Data | Sector 3 Data |
| ⋮ | | | | | |
| LPN 1A07h | Status | Sector 0 Data | Sector 1 Data | Sector 2 Data | Sector 3 Data |

MEMORY DEVICE AND OPERATING METHOD OF MEMORY DEVICE

CROSS-REFERENCE TO RELATED APPLICATION

This application claims the benefit under 35 U.S.C. §119(a) of a Korean Patent Application No. 10-2008-0097061, filed on Oct. 2, 2008 in the Korean Intellectual Property Office, the entire disclosure of which is incorporated herein by reference.

BACKGROUND

1. Field

The following description relates to a memory device and a method of operating the memory device.

2. Description of the Related Art

Examples of a storage device to store data include a magnetic disk drive, a semiconductor device, and the like. Since physical characteristics are different for each type of storage device, a management method corresponding to the physical characteristic of a particular data storage device is desirable.

A read/write time of a magnetic disk drive may take an average of several milliseconds per kilobyte. The read/write time of the magnetic disk drive may also vary since an arrival time of an arm may be different depending on a physical location of a disk where data is stored.

In contrast to a magnetic disk drive, a non-volatile memory device takes a relatively short read/write time, consumes less power, and occupies a smaller amount of space.

A non-volatile memory device is a semiconductor device that is able to electrically read, write, and erase data, and maintain stored data even where power is cut off. A process of storing data in the non-volatile memory device may be referred to as programming as well as writing.

Programming with respect to a non-volatile memory device may be performed in page units and erasing may be performed in block units. A block may include a plurality of pages. A controller of the non-volatile memory device may provide a logical address to an external host or processor, and also provide a physical address with respect to the non-volatile memory device. The controller may manage the non-volatile memory device using the physical address and may convert the physical address into the logical address. A layer where converting of the physical address to the logical address is performed may be referred to as a Flash Translation Layer.

SUMMARY

In one general aspect, there is provided a memory device including a plurality of data blocks and one or more metadata blocks and storing first metadata corresponding to the plurality of data blocks in the one or more metadata blocks, and a non-volatile RAM being capable of reading and writing in byte units or word units and storing second metadata.

The second metadata may include an erase count of each of the plurality of data blocks.

The second metadata may include state information corresponding to each of a plurality of pages included in each of the plurality of data blocks.

The second metadata may include an erase count of each of the one or more metadata blocks.

The second metadata may include state information of each of the plurality of pages included in each of the one or more metadata blocks.

The second metadata may include a mapping relation between a logical block address and physical address of a data page stored in the plurality of data blocks, and the first metadata may include a mapping relation between a logical page address and a physical page address in the logical block address of the data page stored in the plurality of data blocks.

The non-volatile RAM may store data corresponding to a write command and stores map information corresponding to the stored data, where the write command with respect to the non-volatile memory is a random write.

The RAM may select eviction data from among the stored data based on the map information where a size of available space is less than a threshold, and programs at least one of the plurality of data blocks of the non-volatile memory with the eviction data.

The non-volatile RAM may program the at least one of the plurality of data blocks with the eviction data and updates the map information.

The non-volatile RAM may output stored data as data corresponding to a read command where data corresponding to the read command with respect to the non-volatile memory exists in the non-volatile RAM.

In another general aspect, there is provided a method of operating a memory device, including verifying whether a write command with respect to the non-volatile memory is a random write or a sequential write, storing data corresponding to the write command in the non-volatile RAM where the write command is the random write, and programming data corresponding to the write command in the non-volatile memory where the write command is the sequential write.

The verifying may comprise verifying whether the write command is the sequential write where a size of the data corresponding to the write command is equal to or more than a threshold.

The storing may comprise storing map information corresponding to the stored data in the non-volatile RAM.

The method may further comprise verifying whether a size of available space of the non-volatile RAM is less than the threshold, selecting eviction data from among data stored in the non-volatile RAM where the size of the available space is less than the threshold, and programming the eviction data to the non-volatile memory.

The method may further comprise verifying whether data corresponding to a read command with respect to the non-volatile memory exists in the non-volatile RAM, reading data corresponding to the read command from the non-volatile RAM where the data corresponding to the read command exists in the non-volatile RAM, and transmitting the data read from the non-volatile RAM to a host or a controller.

In still another general aspect, there is provided a method of operating a memory device, including converting a logical block address of an access command with respect to the non-volatile memory into a physical address based on map information stored in a non-volatile RAM, accessing page map information stored in a metadata area of the non-volatile memory based on the physical address, converting a logical page address of the access command into a physical page address based on the accessed page map information, and accessing data stored in a data area of the non-volatile memory based on the physical page address.

The method may further comprise assigning the access command to any one of a plurality of channels of the non-volatile memory based on a remainder after dividing the logical block address or the logical page address of the access command by a number of the channels.

In a further general aspect, there is provided a method of a garbage collection of a memory device, including selecting a first block from among a plurality of blocks of the non-volatile memory stored in a non-volatile RAM based on state information of each of the plurality of blocks, where available space of the non-volatile memory is less than a threshold, selecting any one block from among at least one free block of the non-volatile memory as a second block, programming the second block with valid data from among data stored in the first block, and erasing the first block where the second block is programmed with the valid data from among the data stored in the first block.

The selecting may comprise selecting a block having a smallest number of valid pages from among the plurality of blocks as the first block.

Other features will become apparent to those skilled in the art from the following detailed description, which, taken in conjunction with the attached drawings, discloses exemplary embodiments.

BRIEF DESCRIPTION OF THE DRAWINGS

FIG. 6 is a diagram illustrating an example of information that is stored in a write map cache of FIG. 2.

FIG. 7 is a diagram illustrating an example of data that is stored in a write data buffer of FIG. 2.

Throughout the drawings and the detailed description, the same drawing reference numerals will be understood to refer to the same elements, features, and structures. The elements may be exaggerated for clarity and convenience.

DETAILED DESCRIPTION

The following detailed description is provided to assist the reader in gaining a comprehensive understanding of the methods, apparatuses and/or systems described herein. Accordingly, various changes, modifications, and equivalents of the systems, apparatuses and/or methods described herein will be suggested to those of ordinary skill in the art. Also, descriptions of well-known functions and constructions are omitted to increase clarity and conciseness.

Figure 1:
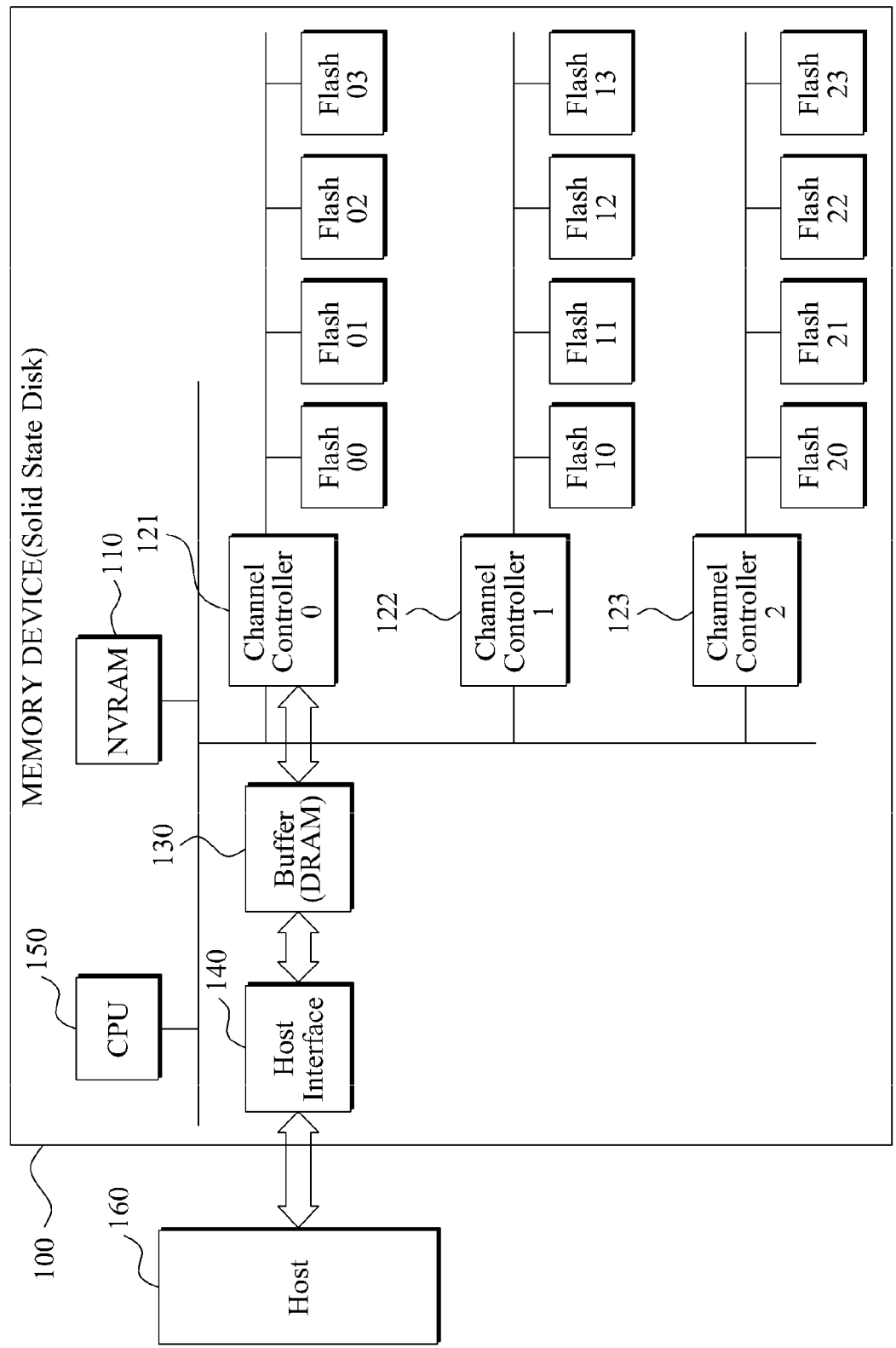
FIG. 1 is a diagram illustrating a memory device according to an exemplary embodiment.

FIG. 1 illustrates a memory device 100 according to an exemplary embodiment. The memory device 100 may be a Solid State Disk (SSD). The SSD is a device that embodies a high-capacity storage using a plurality of flash memory chips (Flash 00, 01, 02, 03, 10, 11, 12, 13, 20, 21, 22, and 23) and may be used in place of a storage device such as a hard disk, and the like.

The plurality of flash memories (Flash 00, 01, 02, 03, 10, 11, 12, 13, 20, 21, 22, and 23) of FIG. 1 may be of a NAND flash memory type or a NOR flash memory type. NAND flash memories are typically used to perform high-capacity storage. A read time of the NAND flash memory may take several tens of microseconds per kilobyte and a write time take several hundred microseconds per kilobyte. Also, the NAND flash memory may generally have an erase time which is different from the write time. Since the erase time may be around several milliseconds, a method of erasing a plurality of memory cells at the same time is widely used to reduce the erase time with respect to an entire set of data. A unit of the plurality of memory cells that are simultaneously erased may be an erase unit, an erase block, or a block.

A non-volatile memory including the NAND flash memory may be subject to asymmetrical reading/writing/erasing operations that require different times to perform each of the reading/writing/erasing, unlike in a magnetic disk drive. Also, the non-volatile memory electrically accesses data. Accordingly, a location where data is stored may minimally affect the reading/writing/erasing for the non-volatile memory, unlike the magnetic disk drive.

Since a data erasing process of a magnetic disk drive is included in a data writing process, a time to erase the data is not separately required. Accordingly, where data needs to be updated, the magnetic disk drive may simply overwrite updated data to a previous data location.

In the case of the non-volatile memory, data erasing process and data writing process are separated. Accordingly, it may take a longer time to erase data in the non-volatile memory. As such, where a data update method applied to a magnetic disk is applied to the non-volatile memory, longer time may be required to update data. Moreover, a time expended to update data may become longer where the data is randomly accessed and updated.

Accordingly, channel controllers (0 through 2) 121, 122, and 123 may manage the plurality of flash memories (Flash 00, 01, 02, 03, 10, 11, 12, 13, 20, 21, 22, and 23) using a physical address that has a value different from a value of a logical address received from a host 160. A function of mapping the physical address to the logical address that the host 160 recognizes may be performed in a NVRAM 110 or the channel controllers (0 through 2) 121, 122, and 123.

The NVRAM 110 may perform reading and writing in byte units or word units. The NVRAM 110 may not separately require an erasing process unlike the NAND flash memory, and may perform a read/write operation with a cost level similar to a Dynamic Random Access Memory (DRAM) or Static Random Access Memory (SRAM). Examples of the NVRAM 110 include Ferro-electric RAM (FRAM), Magneto-resistive RAM (MRAM), Phase-change RAM (PRAM), and the like.

Also, the NVRAM 110 may perform in-place update of previously stored data, similar to the SRAM or DRAM.

A host interface 140 may mediate communication between the host 160 and a Central Processor Unit (CPU) 150. A buffer 130 may temporarily store data that is transmitted/received between the host 160 and the memory device 100. Although the buffer 130 may be either DRAM or SRAM, FIG. 1 illustrates an example where the buffer 130 is the DRAM.

The host 160 may access a flash memory to read data stored in the flash memory or to store data in the flash memory. Since a time that the host 160 expends to read data from the flash memory may be relatively long with respect to the host 160, the host 160 may store a portion of data stored in the flash memory using the buffer 130.

Where the host 160 reads previously-read data a second time, the read time is shorter during the second read. This phenomenon is referred to as temporal locality. The data that the host 160 reads from the flash memory may be stored in the buffer 130. The above described function of the buffer 130 is referred to a read cache. Also, data transmission between the host 160 and flash memory may be reduced by effectively utilizing the temporal locality.

Also the host 160 tends to refer to data stored in a nearby location. This tendency is referred to as a spatial locality.

The Flash 00, 01, 02, and 03 may form a channel 0. In this case, the channel controller (0) 121 may receive a physical address from the NVRAM 110, and manage the Flash 00, 01, 02, and 03 which form the channel 0 using the physical address.

The Flash 10, 11, 12, and 13 may form a channel 1. In this case, the channel controller (1) 122 may receive the physical address from the NVRAM 110, and manage the Flash 10, 11, 12, and 13 which form the channel 1 using the physical address.

The Flash 20, 21, 22, and 23 may form a channel 2. In this case, the channel controller (2) 123 may receive the physical address from the NVRAM 110, and manage the Flash 20, 21, 22, and 23 which form the channel 2 using the physical address.

Although FIG. 1 illustrates an exemplary embodiment describing how four flash memories form a single channel, it is apparent to a person of ordinary skill in the art that the exemplary embodiment is not limited to a predetermined number of flash memory units.

Although FIG. 1 illustrates an exemplary embodiment including three channels, it is apparent to a person of ordinary skill in the art that the exemplary embodiment is not limited to a predetermined number of channels.

Figure 2:
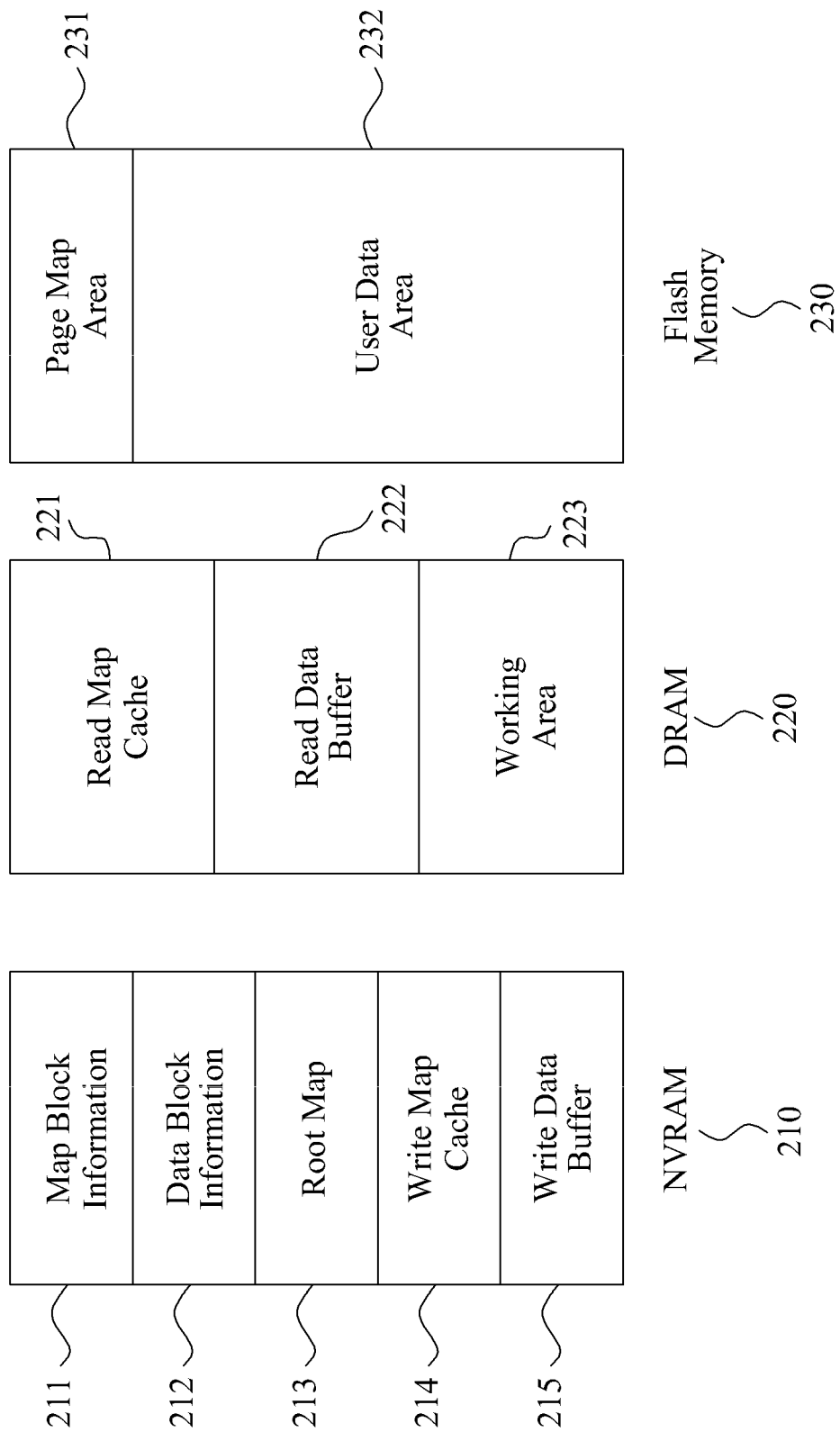
FIG. 2 is a diagram illustrating an example of a storage space of Non-Volatile Random Access Memory (NVRAM), a buffer, and a plurality of flash blocks (Flash 00, 01, 02, 03, 10, 11, 12, 13, 20, 21, 22, and 23) of FIG. 1.

A storage space of the NVRAM 110 of FIG. 1 is illustrated in FIG. 2.

A NVRAM 210 of FIG. 2 includes map block information, a data block information 212, a root map 213, a write map cache 214, and a write data buffer 215.

An example of a storage space of the buffer 130 of FIG. 1 is illustrated in FIG. 2.

A DRAM 220 of FIG. 2 includes a read map cache 221, a read data buffer 222, and a working area 223.

A storage space of the plurality of flash blocks (Flash 00, 01, 02, 03, 10, 11, 12, 13, 20, 21, 22, and 23) is illustrated in FIG. 2.

A flash memory 230 of FIG. 2 includes a page map area 231 and user data area 232.

The user data area 232 may include a plurality of data blocks. A single data block may be a set of memory cells that are erased at a time. The single data block may include a plurality of pages and a single page may be a set of memory cells that are programmed simultaneously.

In the page map area 231, mapping information with respect to the user data area 232 may be stored. The mapping information may be referred to as metadata. The page map area 231 may include one or more metadata blocks. The metadata blocks may include a plurality of pages. The metadata blocks may be a set of memory cells that are erased simultaneously, and the page may be a set of memory cells that are programmed at a particular time. In the page map area 231, a physical page address corresponding to each page of the user data area may be stored. As described above, converting between a logical address and physical address in a page level is referred to as a page-level mapping.

State information of each block of the flash memory 230 may be stored in the NVRAM 210. State information of each metadata block of the page map area 231 may be stored in the map block information 211. Also, state information of each data block of the user data area 232 may be stored in the data block information 212.

Mapping information of a logical block address level that a host 160 recognizes may be stored in the NVRAM 210. Mapping information between a logical block address and physical block address may be stored in the root map 213.

Data corresponding to a write command may be stored in the NVRAM 210. Data corresponding to a random write command may be stored in the write data buffer 215. Management information corresponding to data stored in the write data buffer 215 may be stored in the write map cache 214.

Data read in response to a read command from the user data area 232 may be temporarily stored in the DRAM 220. The data read from the user data area 232 may be stored in the read data buffer 222. Management information corresponding to data stored in the read data buffer 222 may be stored in the read map cache 221. Data used for a process of a CPU 150 may be stored in the working area 223.

Figure 3:
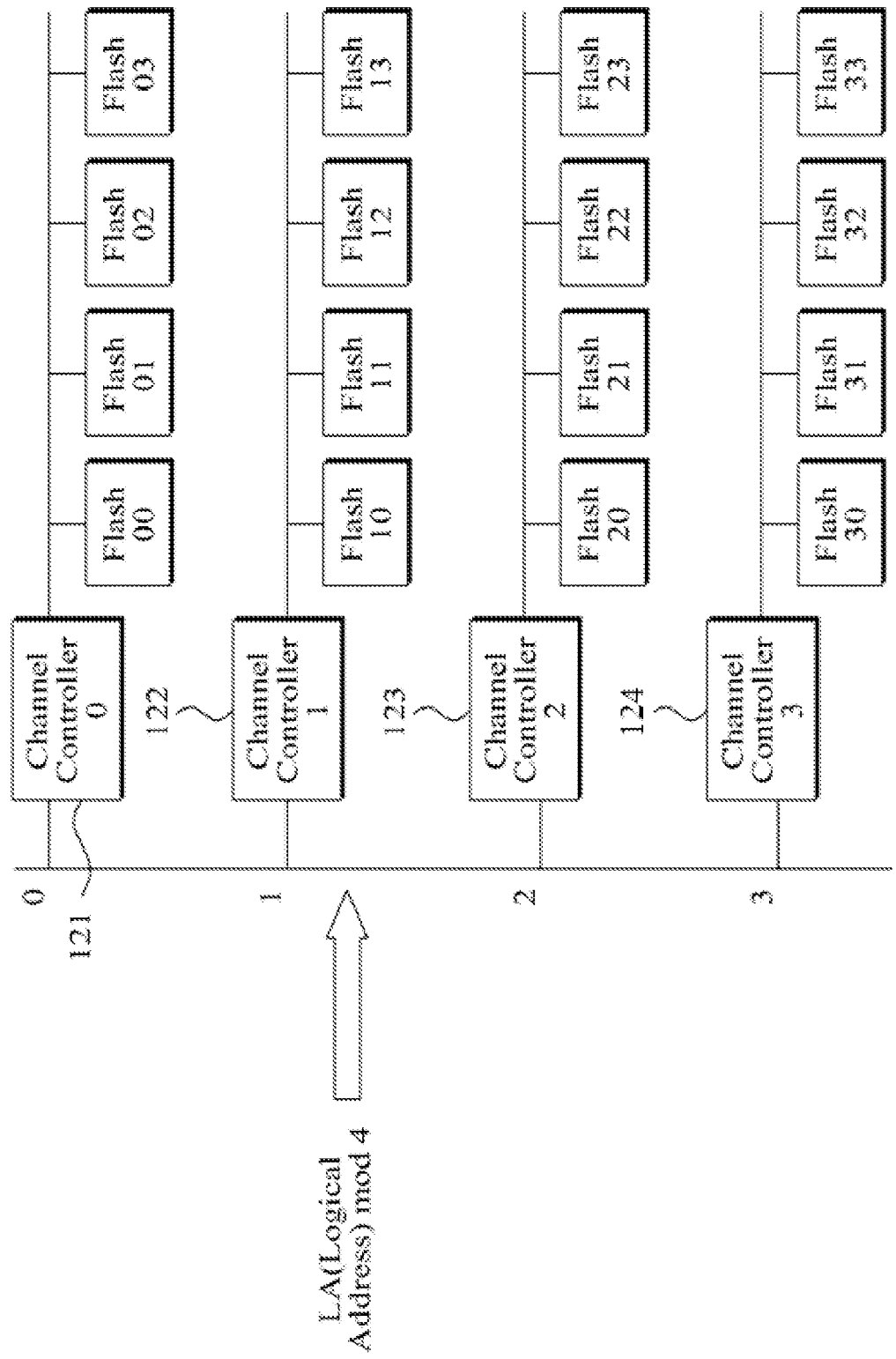
FIG. 3 is a diagram illustrating four channels according to an example of the memory device of FIG. 1.

FIG. 3 illustrates four channels according to an example of the memory device of FIG. 1.

A channel controller (0) 121 may control a channel 0 including the Flash 00, the Flash 01, the Flash 02, and the Flash 03. A channel controller (1) 122 may control a channel 1 including the Flash 10, the Flash 11, the Flash 12, and the Flash 13. A channel controller (2) 123 may control a channel 2 including the Flash 20, the Flash 21, the Flash 22, and the Flash 23. A channel controller (3) 124 may control a channel 3 including the Flash 30, the Flash 31, the Flash 32, and the Flash 33.

Where a remainder after dividing a logical address transmitted from a host 160 by four is zero, the channel controller (0) 121 may convert the logical address into a physical address corresponding to the channel 0. Where a remainder after dividing a logical address by four is one, the channel controller (1) 122 may convert the logical address into a physical address corresponding to the channel 1. Where a remainder after dividing a logical address by four is two, the channel controller (2) 123 may convert the logical address into a physical address corresponding to the channel 2. Where a remainder after dividing a logical address by four is three, the channel controller (3) 124 may convert the logical address into a physical address corresponding to the channel 3.

As described above, a method of mapping the logical address to a plurality of channels is referred to as a multi-channel interleaving. Where the multi-channel interleaving is combined with the page-level mapping, quantity of the mapping information managed in each channel may be reduced. Also, where sequential accessing is performed, the multi-channel interleaving may distribute data transmission to each channel and reduce concentrating data transmission to a single channel.

Figure 4:
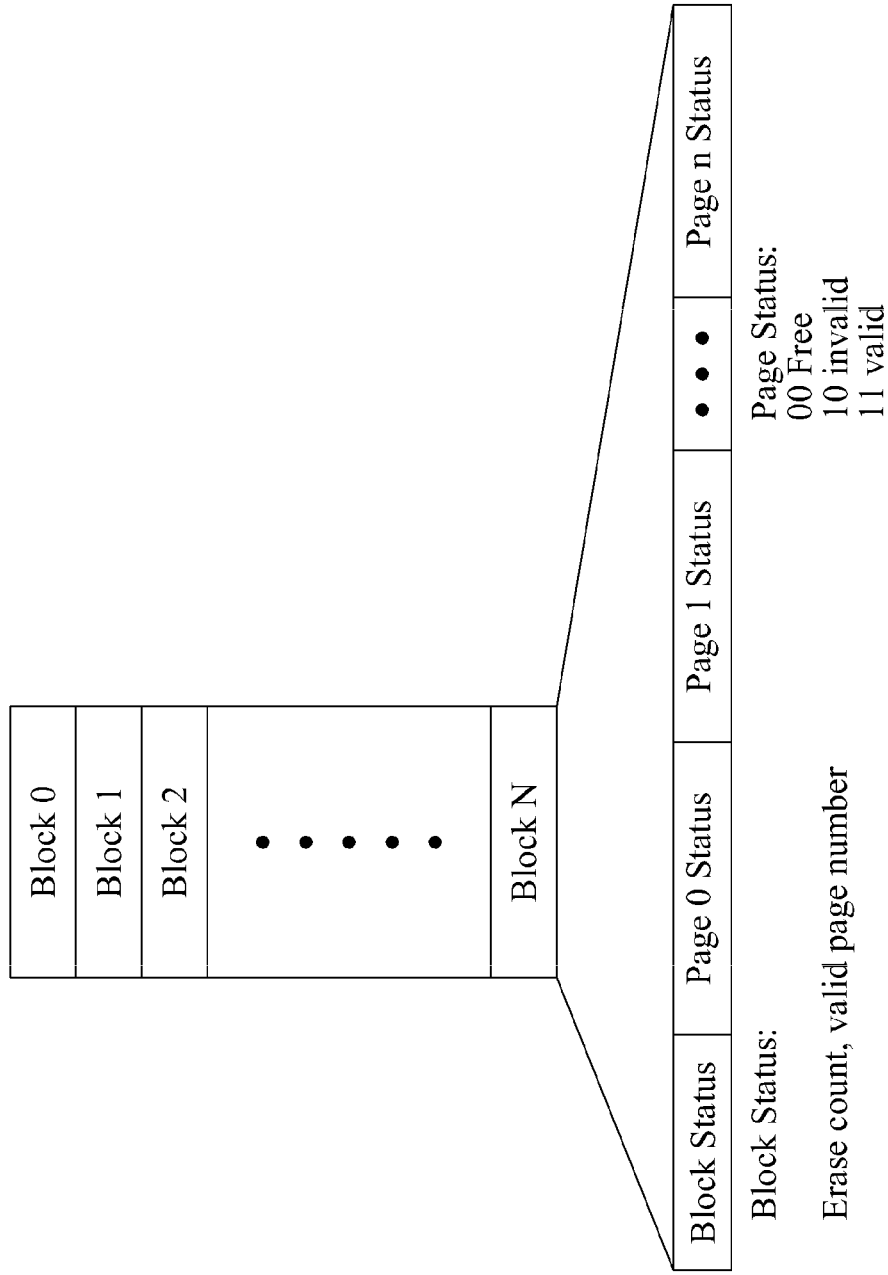
FIG. 4 is a diagram illustrating an example of a storage space of map block information and data block information of FIG. 2.

FIG. 4 illustrates an example of a storage space of the map block information 211 and the data block information 212 of FIG. 2.

The data block information 212 will be described in detail hereinafter.

It is assumed that a user data area 232 includes of N data blocks.

A single data block includes n pages.

Information with respect to each data block may include block state information and state information corresponding to each of the n pages.

The state information corresponding to each page may indicate whether the page is free, valid, or invalid. Where data is not stored in the page, the page is free. Where data is stored in the page and the stored data is valid, the page is valid. Also, where data is stored in the page and the stored data is invalid, the page is invalid.

For example, where the page state information is "00," it indicates that the page is free. Where the page state information is "10," it indicates that the page is invalid, and where the page state information is "11," it indicates that the page is valid. Where data stored in the page is not a recent version, but an obsolete version, the page is invalid.

The block state information may include an erase count of a block and a number of valid pages from among pages included in the block.

Figure 5:
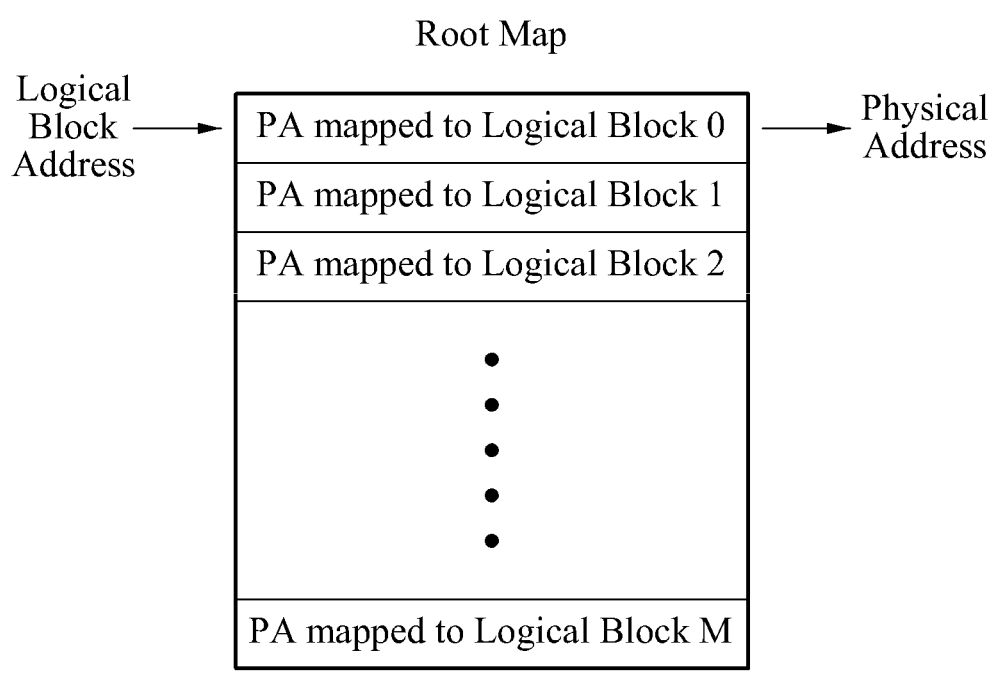
FIG. 5 is a diagram illustrating an example of storage space of a root map of FIG. 2.

FIG. 5 illustrates an example of a storage space of the root map 213 of FIG. 2.

A physical address corresponding to a logical block address may be stored in the root map 213. The physical address may represent a page address of a page map area 231 where page level mapping information corresponding to the logical block address is stored. The channel controllers (0 thorough 3) 121 through 124 may obtain the physical address from the root map 213 of NVRAM 110 and access the page map area 231 of Flash 00, 01, 02, 03, 10, 11, 12, 13, 20, 21, 22, 23, 30, 31, 32, and 33 using the physical address.

Since an in-place update with respect to data stored in the NVRAM 110 is possible, a physical address mapped to a logical block 0 may be stored in a first entry of the root map 213 and a physical address mapped to a logical block 1 may be stored in a second entry of the root map 213. The root map 213 may have as many entries as a number of the logical blocks M.

The channel controllers (0 through 3) 121 through 124 may access the page map area using the physical address and obtain a physical page address from the page map area 231. Mapping information of a block level may be stored in the NVRAM 110 and mapping information of a page level may be store in the page map area 231. Since the mapping information is managed in two levels, a memory space to store mapping information may be reduced.

FIG. 6 illustrates an example of information that is stored in the write map cache 214 of FIG. 2.

A NVRAM 110 may verify whether a write command is a random write or a sequential write. Where the write command is verified as the random write, the NVRAM 110 may store data for the write command in a write data buffer 215. In this instance, the NVRAM 110 may verify the write command as the sequential write where a data size of the write command is greater than a predetermined threshold and may verify the write command as the random write where the data size of the write command is less than the predetermined threshold.

Due to a spatial locality, a host 160 may frequently generate a command to read and write data at the same time in a nearby logical address. The above described write command is the sequential write, and a write command that is not the sequential write is the random write.

Information corresponding to the sequential write and information corresponding to the random write are divided and stored in the write map cache 214.

The information corresponding to the sequential write may include a logical block number (LBN) and may further include a physical address that is mapped to each logical page included in the LBN. Where a number of pages included in a single logical block is n, the information corresponding to the sequential write may include a LBN, a physical address corresponding to a logical page 0, . . . , and a physical address corresponding to a logical page n.

For example, where the sequential write corresponds to a logical block 120h, each logical page included in the logical block 120h may be mapped with a physical address through the channel controllers (0 through 3) 121 through 124. The NVRAM 110 may store the physical address mapped to each logical page of the logical block 120h.

Where the sequential write corresponds to a logical block 1F0h, each logical page included in the logical block 1F0h may be mapped with a physical address through the channel controllers (0 through 3) 121 through 124. The NVRAM 110 may store the physical address mapped to each logical page of the logical block 1F0h.

The information corresponding to the random write may include a logical address of each random write and a physical address mapped to the logical address. For example, where a random write corresponding to a logical address 10F0h is requested, the channel controllers (0 through 3) 121 through 124 may assign a physical address to the logical address 10F0h.

The physical address mapped to the logical address 10F0h may be stored in the NVRAM 110.

In the same manner, a physical address mapped to a logical address 11CAh corresponding to a random write request and a physical address mapped to a logical address 1FA0h may be stored in the NVRAM 110.

Mapping information of logical pages including the logical block corresponding to the sequential write may be accumulated and stored in the write map cache 214. Where the sequential write is performed, data corresponding to the sequential write may not be stored in the NVRAM 110, but programmed in a user data area 232.

Where the random write is requested, data corresponding to the random write may not be programmed in the user data area 232, but may be stored in the write data buffer 215 of the NVRAM 110 in advance.

Where a size of an available space of the write data buffer 215 is less than a predetermined threshold (where the available space is insufficient), the NVRAM 110 may arrange random write data of the write data buffer 215 to reconstruct as a sequential write data format. In this case, the NVRAM 110 may also reconstruct mapping information corresponding to the random write data as a mapping information format corresponding to the sequential write data.

FIG. 7 illustrates an example of data that is stored in the write data buffer 215 of FIG. 2.

A host 160 may transmit write data in sector units. A sector may be 512 bytes or may be in a different size. Although a page may be 2 kilobytes or 16 kilobytes, it is understood and apparent to a person skilled in the art that the exemplary embodiment is not limited to a size of the sector and a size of the page.

A NVRAM 110 may arrange data (i.e., data originally arranged in sector units) received from the host 160 into data arranged in page units.

A logical page number (LPN) and data of a sector corresponding to a logical page may be stored in the write data buffer 215. For example, where a write command corresponding to a LPN 1110h is received, state information of the LPN 1110h and data of sectors 0 through 3 of the LPN 1110h may be stored in the write data buffer 215.

In the same manner, state information of the LPN 1111h and data of sectors 0 through 3 of the LPN 1111h may also be stored in the write data buffer 215.

Since a time taken to store data in the NVRAM 110 is shorter than a time taken to program the data in a flash memory, the NVRAM 110 may store data of a random write and program the data in the flash memory at the same time, thereby reducing operation time to perform a write operation. Also, the NVRAM 110 may reduce a number of data transmissions from the host 160 to the flash memory.

Where an available space of the write data buffer 215 is insufficient, the NVRAM 110 may arrange the random write data and rearrange the data to make a sequential write possible.

The station information of LPN 1110h may represent whether data of each sector is valid. Where sector data stored in the write data buffer 215 is invalid, the NVRAM 110 may read valid data corresponding to an invalid sector from the flash memory. The NVRAM 110 may overwrite the valid data to the invalid sector and update the state information of the LPN 1110h.

Although FIGS. 6 and 7 illustrate the write map cache 214 and write data buffer 215 of the NVRAM 110, a read map cache 221 and read data buffer 222 of a buffer 130 may be in a similar format.

The NVRAM 110 may have advantages, such as a faster read and write speed than a NAND flash memory, and the like. However, since a high-capacity NVRAM may not be currently available, a standard to select information to be stored in the NVRAM 110 may be desirable. A memory device 100 may store block level mapping information in the NVRAM 110, store page level mapping information in a page map area 231, thereby optimizing quantity of information stored in the NVRAM 110 and the flash memory. Also, the NVRAM 110 may reduce quantity of mapping information using a two-level mapping method.

The memory device 100 may store state information of each block of the flash memory in the NVRAM 110, and perform in-place update of the stored state information, thereby minimizing a storage space. The memory device 100 may store frequently updated information in the NVRAM 110 and may store relatively infrequently updated information in the flash memory.

The memory device 100 may store the data of the random write in the NVRAM 110, arrange the stored random write data, and thereby store the data in the flash memory in a similar way as the sequential write. Since a frequency of a data transmission between the host 160 and the flash memory decreases, efficiency of the memory device 100 that the host 160 recognizes may increase.

Figure 8:
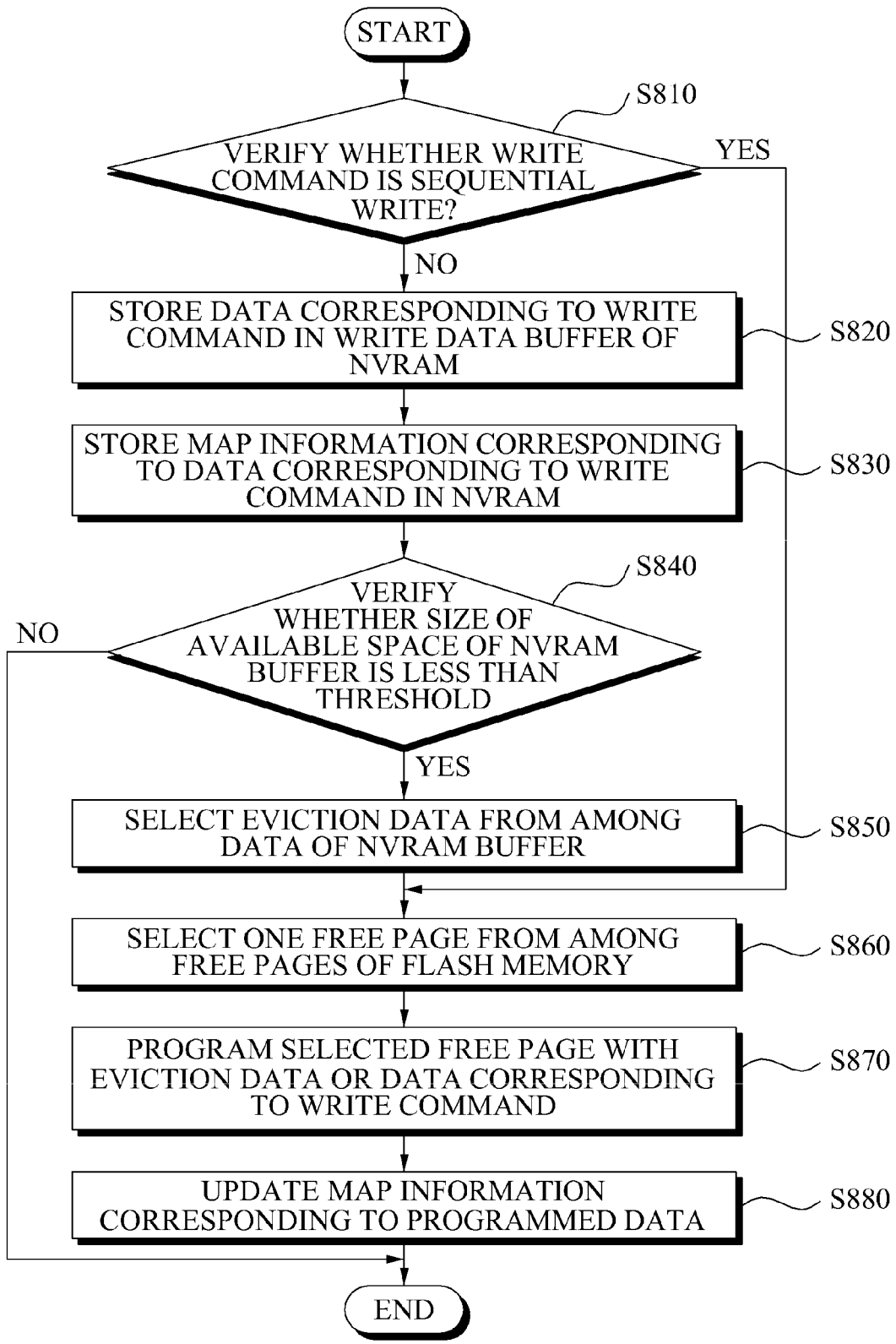
FIG. 8 is a flowchart illustrating an operating method of the memory device of FIG. 1 according to an exemplary embodiment.

FIG. 8 is a flowchart illustrating an operating method of the memory device 100 of FIG. 1 according to an exemplary embodiment.

The memory device 100 verifies whether a write command is a sequential write in operation S810.

Where the write command is not the sequential write, the memory device 100 stores data corresponding to the write command in a write data buffer 215 of a NVRAM 110 in operation S820.

The memory device 100 stores map information corresponding to the data of the write command in a write map cache 214 of the NVRAM 110 in operation S830.

The memory device 100 verifies whether a size of an available space of the write data buffer is less than a predetermined threshold in operation S840.

Where the size of the available space is less than the predetermined threshold, the memory device 100 selects eviction data from among data of the write data buffer 215 in operation S850.

The memory device 100 selects any one free page from among free pages of Flash 00, 01, 02, 03, 10, 11, 12, 13, 20, 21, 22, and 23 in operation S860.

The memory device 100 programs the selected free page with the eviction data in operation S870.

The memory device 100 updates map information corresponding to the programmed data in operation S880. In this case, the memory device 100 may update map block information 211, data block information 212, a root map 213, the write map cache 214, and a page map area 231.

Where the write command is sequential write, the memory device 100 proceeds with performing of the operation S860. Accordingly, the memory device 100 selects free page with the data corresponding to the write command in operation S870.

Where the available space of the NVRAM 110 is greater than the predetermined threshold, the memory device 100 may end a corresponding process.

Figure 9:
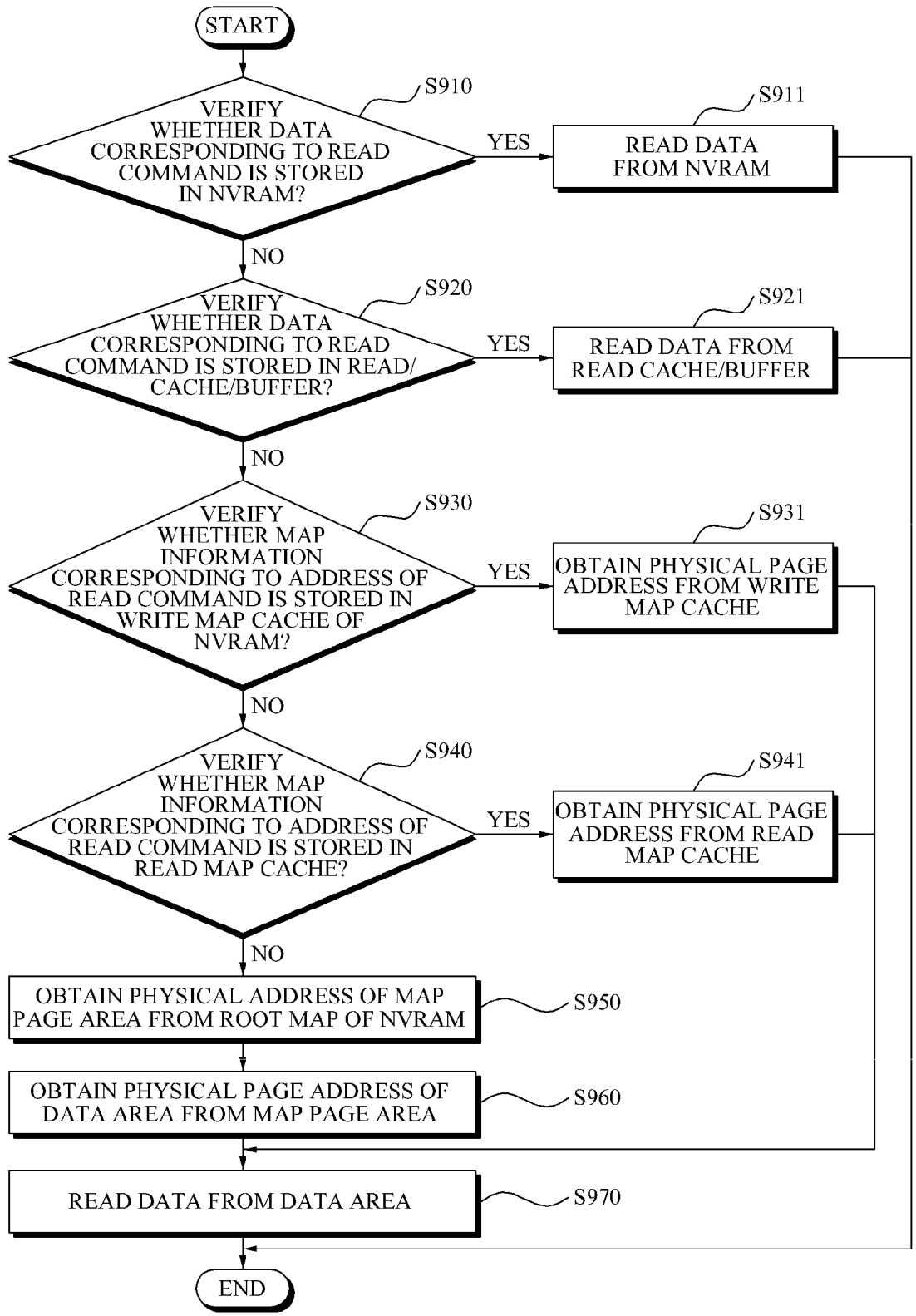
FIG. 9 is a flowchart illustrating an operating method of the memory device of FIG. 1 according to another exemplary embodiment.

FIG. 9 is a flowchart illustrating an operating method of the memory device 100 of FIG. 1 according to another exemplary embodiment.

The memory device 100 verifies whether data corresponding to a read command exists in a NVRAM 110 in operation S910.

Where the data corresponding to the read command exists in the NVRAM 110, the memory device 100 reads the data from the NVRAM 110 in operation S911.

Where the data corresponding to the read command does not exist in the NVRAM 110, the memory device 100 verifies whether the corresponding to the read command exists in a Read/Cache buffer 130 in operation S920.

Where the data corresponding to the read command exists in the Read/Cache buffer 130, the memory device 100 reads the data from the Read/Cache buffer 130 in operation S921.

Where the data corresponding to the read command does not exist in the Read/Cache buffer 130, the memory device 100 verifies whether map information corresponding to an address of the read command exists in a write map cache 214 of the NVRAM 110 in operation S930.

Where the map information corresponding to the address of the read command exists in the write map cache 214, the memory device 100 obtains a physical page address from the write map cache 214 in operation S931.

Where the map information corresponding to the address of the read command does not exist in the write map cache 214, the memory device 100 verifies whether the map information corresponding to the address of the read command exists in a read map cache 221 in operation S940.

Where the map information corresponding to the address of the read command exists in the read map cache 221, the memory device 100 obtains the physical page address from the read map cache 221 in operation S941.

The memory device 100 reads data from a data area 232 using the physical page address obtained through either operation S931 or operation S941, in operation S970.

Where the map information corresponding to the address of the read command exists in the read map cache 221, the memory device 100 obtains a physical address of a map page area 231 from a root map 213 of the NVRAM 110 in operation S950.

The memory device 100 accesses a page indicated by the physical address within the map page area 231. The memory device 100 obtains the physical page address of the data area 232 from the map page area 231 in operation S960.

The memory device 100 accesses a page indicated by the physical page address within the data area 232. The memory device 100 reads the data from the data area 232 in operation S970.

Figure 10:
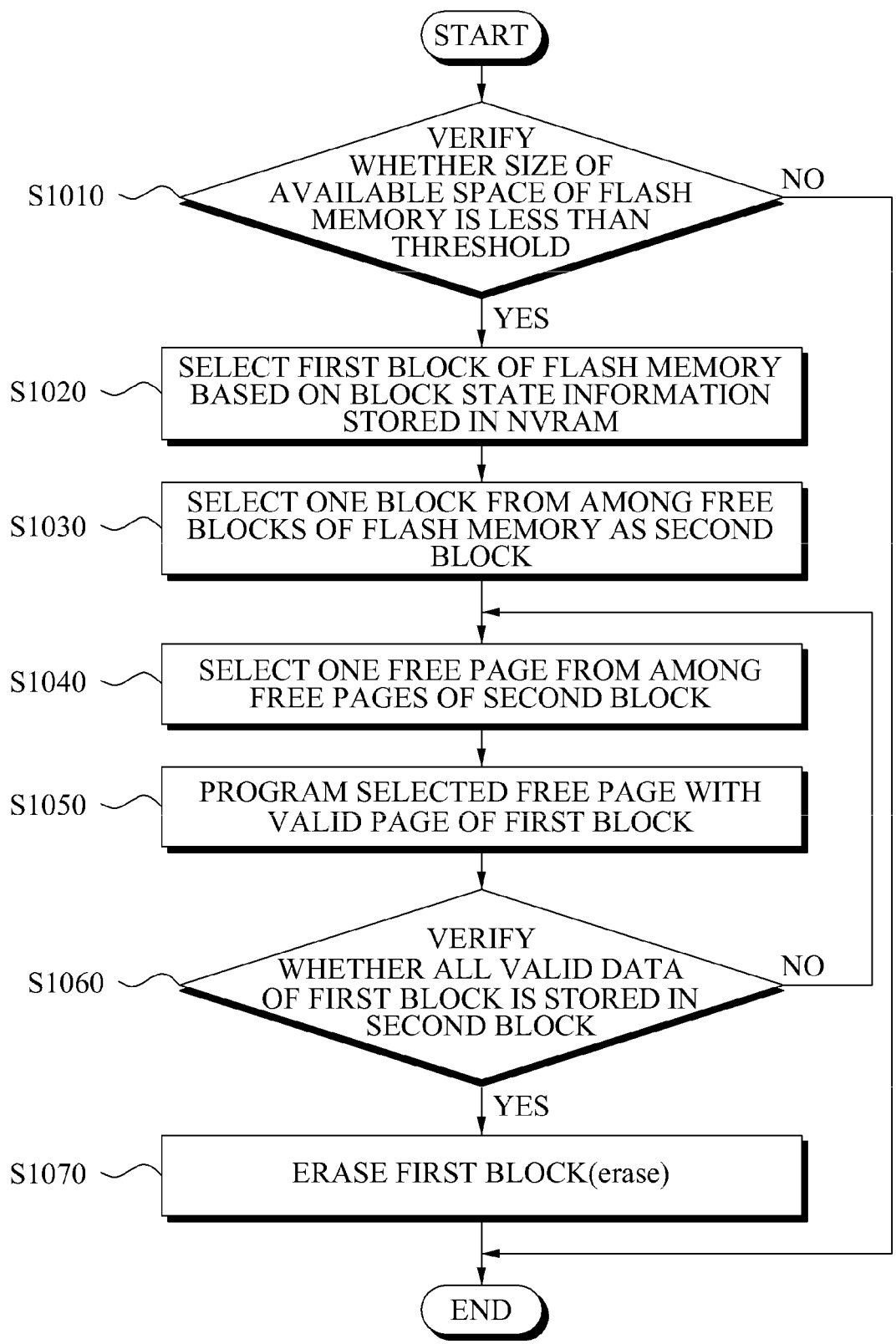
FIG. 10 is a flowchart illustrating an example of a garbage collection method of the memory device of FIG. 1.

FIG. 10 is a flowchart illustrating a garbage collection method of the memory device 100 of FIG. 1 according to an exemplary embodiment.

The memory device 100 verifies whether a size of an available space of Flash 00, 01, 02, 03, 10, 11, 12, 13, 20, 21, 22, and 23 is less than a predetermined threshold in operation S1010.

Where the size of the available space is less than the predetermined threshold, the memory device 100 selects a first block from among blocks of the Flash 00, 01, 02, 03, 10, 11, 12, 13, 20, 21, 22, and 23 based on block state information stored in the NVRAM 100 in operation S1020.

The memory device 100 selects a second block from among free blocks of the Flash 00, 01, 02, 03, 10, 11, 12, 13, 20, 21, 22, and 23 in operation S1030.

The memory device 100 selects one free page from among free pages of the second block in operation S1040.

The memory device 100 programs the selected free page with a valid page of the first block in operation S1050.

The memory device 100 verifies whether all valid data of the first block is stored in the second block in operation S1060.

Where a portion of the valid data of the first block is not stored in the second block, the memory device 100 newly selects one free page from among the free pages of the second block in operation S1040.

Where all the valid data is stored in the second block, the memory device 100 erases the first block in operation S1070.

The methods described above including an operating method of a memory device may be recorded, stored, or fixed in one or more computer-readable media that includes program instructions to be implemented by a computer to cause a processor to execute or perform the program instructions. The media may also include, alone or in combination with the program instructions, data files, data structures, and the like. The media and program instructions may be those specially designed and constructed, or they may be of the kind well-known and available to those having skill in the computer software arts. Examples of computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations and methods described above, or vice versa.

Flash memory devices and/or memory controllers according to exemplary embodiments may be embodied using various types of packages. For example, the flash memory devices and/or memory controllers may be embodied using packages such as Package on Packages (PoPs), Ball Grid Arrays (BGAs), Chip Scale Packages (CSPs), Plastic Leaded Chip Carrier (PLCC), Plastic Dual In-Line Package (PDIP), Die in Waffle Pack, Die in Wafer Form, Chip On Board (COB), Ceramic Dual In-Line Package (CERDIP), Plastic Metric Quad Flat Pack (MQFP), Quad Flatpack (QFP), Small Outline Integrated Circuit (SOIC), Shrink Small Outline Package (SSOP), Thin Small Outline (TSOP), Thin Quad Flatpack (TQFP), System In Package (SIP), Multi Chip Package (MCP), Wafer-level Fabricated Package (WFP), Wafer-Level Processed Stack Package (WSP), and the like.

The flash memory devices and/or the memory controllers may include memory cards. In this case, the memory controllers may be constructed to communicate with an external device for example, a host using any one of various types of protocols such as a Universal Serial Bus (USB), a Multi Media Card (MMC), a Peripheral Component Interconnect-Express (PCI-E), Serial Advanced Technology Attachment (SATA), Parallel ATA (PATA), Small Computer System Interface (SCSI), Enhanced Small Device Interface (ESDI), and Integrated Drive Electronics (IDE).

The flash memory devices may be non-volatile memory devices that may maintain stored data even where power is cut off. According to an increase in the use of mobile devices such as a cellular phone, a personal digital assistant (PDA), a digital camera, a portable game console, and an MP3 player, the flash memory devices may be more widely used as data storage and code storage. The flash memory devices may be used in home applications such as a high definition television (HDTV), a DVD, a router, and a Global Positioning System (GPS).

A computing system according to exemplary embodiments may include a microprocessor that is electrically connected with a bus, a user interface, a modem such as a baseband chipset, a memory controller, and a flash memory device. The flash memory device may store N-bit data via the memory controller. The N-bit data is processed or will be processed by the microprocessor and N may be 1 or an integer greater than 1. Where the computing system is a mobile apparatus, a battery may be additionally provided to supply operation voltage of the computing system.

It will be apparent to those of ordinary skill in the art that the computing system according to exemplary embodiments may further include an application chipset, a camera image processor (CIS), a mobile Dynamic Random Access Memory (DRAM), and the like. The memory controller and the flash memory device may constitute a solid state drive/disk (SSD) that uses a non-volatile memory to store data.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:
1. A memory device, comprising:
 a processor configured to verify that a write command of a non-volatile memory is a sequential write in response to a size of data of the write command being greater than or equal to a threshold, and verify that the write command is a random write in response to the size of the data of the write command being less than the threshold;
the non-volatile memory including data blocks and a metadata block and configured to store first metadata corresponding to the data blocks in the metadata block; and
a non-volatile RAM configured to read and write in byte units or word units, and store second metadata,
wherein the non-volatile RAM is configured to store data corresponding to a write command and store map information of the stored data, in response to the write command of the non-volatile memory being verified to be a random write.

2. The memory device of claim 1, wherein the second metadata includes an erase count of each of the data blocks.

3. The memory device of claim 1, wherein the second metadata includes state information corresponding to each of pages included in each of the respective data blocks.

4. The memory device of claim 1, wherein the second metadata includes an erase count of the metadata block.

5. The memory device of claim 1, wherein the second metadata includes state information of each of the pages included in the metadata block.

6. The memory device of claim 1, wherein:
the second metadata includes a mapping relation between the logical block address and physical address of a data page stored in the data blocks; and
the first metadata includes a mapping relation between the logical page address and a physical page address in the logical block address of the data page stored in the data blocks.

7. The memory device of claim 1, wherein the RAM is configured to:
select eviction data from among the stored data based on the map information in response to a size of available space being less than a threshold; and
program one of the data blocks of the non-volatile memory with the eviction data.

8. The memory device of claim 7, wherein the non-volatile RAM is configured to:
program the one of the data blocks with the eviction data; and
update the map information.

9. The memory device of claim 1, wherein the non-volatile RAM is configured to output stored data as data corresponding to a read command; in response to data of the read command of the non-volatile memory existing in the non-volatile RAM.

10. A method of operating a memory device including a non-volatile memory and a non-volatile RAM, the method comprising:
verifying that a write command of the non-volatile memory is a sequential write in response to a size of data of the write command being greater than or equal to a threshold;
verifying that the write command is a random write in response to the size of the data of the write command being less than the threshold;
storing data corresponding to the write command and storing map information of the stored data in the non-volatile RAM in response to the write command of the non-volatile memory being verified to be the random write; and
programming data corresponding to the write command in the non-volatile memory in response to the write command being verified to be the sequential write.

11. The method of claim 10, further comprising:
verifying whether a size of available space of the non-volatile RAM is less than the threshold;
selecting eviction data from among data stored in the non-volatile RAM in response to the size of the available space being verified to be less than the threshold; and
programming the eviction data to the non-volatile memory.

12. The method of claim 10, further comprising:
verifying whether data corresponding to a read command with respect to the non-volatile memory exists in the non-volatile RAM;
reading data corresponding to the read command from the non-volatile RAM in response to the data corresponding to the read command being verified to exist in the non-volatile RAM; and
transmitting the data read from the non-volatile RAM to a host or a controller.

13. A method of operating a memory device including a non-volatile memory and a non-volatile RAM, the method comprising:
converting a logical block address of an access command of the non-volatile memory into a physical address based on map information stored in the non-volatile RAM;
accessing page map information stored in a metadata area of the non-volatile memory based on the physical address;
converting a logical page address of the access command into a physical page address based on the accessed page map information;
accessing data stored in a data area of the non-volatile memory based on the physical page address; and
assigning the access command to any one of channels of the non-volatile memory based on a remainder after dividing the logical block address or the logical page address of the access command by a number of the channels,
wherein a value of the remainder determines the assigning of the access command to a specified channel.

14. A non-transitory computer-readable storage medium storing a program to operate a memory device including a non-volatile memory and a non-volatile RAM, comprising instructions to cause a computer to:
verify that a write command of the non-volatile memory is a sequential write in response to a size of data of the write command being greater than or equal to a threshold;
verify that the write command is a random write in response to the size of the data of the write command being less than the threshold;
store data corresponding to the write command and store map information of the stored data in the non-volatile RAM in response to the write command of the non-volatile memory being verified to be the random write; and
program data corresponding to the write command in the non-volatile memory in response to the write command being the sequential write.

* * * * *